US006815745B2

(12) United States Patent
Higo et al.

(10) Patent No.: US 6,815,745 B2
(45) Date of Patent: Nov. 9, 2004

(54) TUNNEL MAGNETORESISTIVE EFFECT ELEMENT, METHOD OF MANUFACTURING TUNNEL MAGNETORESISTIVE EFFECT ELEMENT AND MAGNETIC MEMORY DEVICE

(75) Inventors: Yutaka Higo, Miyagi (JP); Kazuhiro Bessho, Kanagawa (JP); Tetsuya Mizuguchi, Kanagawa (JP); Tetsuya Yamamoto, Kanagawa (JP); Masanori Hosomi, Miyagi (JP); Kazuhiro Ohba, Miyagi (JP); Hiroshi Kano, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/341,857

(22) Filed: Jan. 14, 2003

(65) Prior Publication Data

US 2003/0227799 A1 Dec. 11, 2003

(30) Foreign Application Priority Data

Jan. 23, 2002 (JP) ........................................ 2002-014259

(51) Int. Cl.[7] ............................................. H01L 31/119
(52) U.S. Cl. ......................... 257/295; 257/295; 257/315
(58) Field of Search ................................. 257/295, 296, 257/43, 30, 421, 427; 365/173, 171

(56) References Cited

U.S. PATENT DOCUMENTS 5,650,958 A * 7/1997 Gallagher et al. .......... 365/173

* cited by examiner

Primary Examiner—David Nelms
Assistant Examiner—Thinh T Nguyen
(74) Attorney, Agent, or Firm—Robert J. Depke; Holland & Knight LLP (57) ABSTRACT

When a tunnel magnetoresistive effect element having a multilayer film structure containing two ferromagnetic material layers (11, 12) and a barrier layer (13) is constructed, after one ferromagnetic material layer (11) had been deposited, a conductive layer (16), formed by adding a material of an element different from a metal material to said metal material serving as a principal component thereof, is deposited on the ferromagnetic material layer (11) and the barrier layer (13) is formed by oxidizing the conductive layer (16), whereafter the other ferromagnetic material layer (12) is deposited on the barrier layer (13). Thus, in the tunnel magnetoresistive effect type memory device, dispersion of resistance value between respective elements can be suppressed while a large TMR ratio can be obtained.

3 Claims, 5 Drawing Sheets

TUNNEL MAGNETORESISTIVE EFFECT ELEMENT, METHOD OF MANUFACTURING TUNNEL MAGNETORESISTIVE EFFECT ELEMENT AND MAGNETIC MEMORY DEVICE

This application claims priority to Japanese Patent Application Number JP2002-014259 filed Jan. 23, 2002, which is incorporated herein by reference.

BACKGROUND OF THE INVENTION

1. Field of the Invention

The present invention relates to a tunnel magnetoresistive effect element for generating so-called magnetoresistive (MR) effect in which a resistance value changes with application of a magnetic field from the outside, a method of manufacturing a tunnel magnetoresistive effect element and a magnetic memory device fabricated as a memory device capable of storing information by the use of a tunnel magnetoresistive effect element.

2. Description of the Related Art

In recent years, as information communication devices, in particular, personal small information communication devices such as portable terminal devices (e.g. personal digital assistants) are widely spreading, it is requested that devices such as memories and logic devices comprising these information communication devices or portable terminal devices should become higher in performance, such as they should become higher in integration degree, they can operate at higher speed and they can consume lesser electric power. Particularly, technologies that can make nonvolatile memories become higher in density and larger in storage capacity are becoming more and more important as complementary technologies for replacing hard disk devices and optical disk devices with nonvolatile memories because it is essentially difficult to miniaturize hard disk devices and optical disk devices because they have their movable portions (e.g. head seek mechanism and head rotation mechanism).

Flash memories using semiconductors and an FeRAM (ferro electric random access memory) using a ferro dielectric material are widely known as nonvolatile memories. However, flash memories are able to write information at speed in the order of microseconds and encounters with a defect such that they are slow in speed as compared with a DRAM (dynamic random access memory) and a SRAM (static random access memory). Further, it has been pointed out that the FeRAM cannot be rewritten so many times.

A magnetic memory device called an MRAM (magnetic random access memory), that had been described in "Wang et al IEEE Trans. Magn. 33 (1997), 4498", receives a remarkable attention as a nonvolatile memory that can overcome these defects. The MRAM is a nonvolatile memory from which information can be read out in a nondestructive fashion and which can be accessed randomly. In addition, the MRAM has the following characteristics.

Specifically, the MRAM is simple in structure and therefore can be easily integrated at high integration degree. Further, since the MRAM is able to record information by rotation of magnetic moment, it can be rewritten a large number of times (e.g. more than $10^{16}$ times). Furthermore, it is expected that the MRAM has very high access time and it has already been confirmed that the MRAM can be operated at speed in the order of nanoseconds (e.g. speed lower than 5 nanoseconds). From these characteristics, there is a strong possibility that MRAMs will become a main current in the field of memory devices.

Such MRAM uses a tunnel magnetoresistive effect element as a memory element for recording information. A tunnel magnetoresistive effect element has a trilayer structure composed of ferromagnetic material/insulating material/ferromagnetic material, i.e. ferromagnetic tunnel junction (MTJ (magnetic tunnel junction)) if it is of tunnel magnetoresistive effect (TMR (tunnel magnetoresistive)) type. In the MTJ structure, when the magnetization direction of one ferromagnetic material is used as a fixed layer and the magnetization direction of the other ferromagnetic material is used as a free layer, a resistance value of a tunnel current changes depending upon the magnetization direction of the free layer. To be more in detail, when an external magnetic field is applied to the ferromagnetic material layers under the condition in which a constant current flows through the ferromagnetic material layers, MR effect appears in response to a relative angle of the magnetizations of the two ferromagnetic material layers. When the magnetization directions of the two ferromagnetic material layers are anti-parallel, a resistance value becomes the maximum. When the magnetization directions of the two ferromagnetic material layers are parallel to each other, a resistance value becomes the minimum. Therefore, in response to the magnetization direction of the storage layer, the TMR type tunnel magnetoresistive effect element (hereinafter simply referred to as a "TMR element") is able to store therein information in the form of "1" when magnetization is oriented to a certain direction and is able to store therein information in the form of "0" when magnetization is oriented to the other direction. Further, the TMR type tunnel magnetoresistive effect element becomes able to readout the states of these magnetization directions in the form of a difference current under a constant bias voltage or in the form of a difference voltage under a constant bias current through a TMR effect.

A changing ratio "of a resistance value in the TMR element is expressed as" $= 2 \cdot P1 \cdot P2/(1-P1 \cdot P2)$ where P1, P2 represent spin polarizability of the respective ferromagnetic material layers. A spin polarizability represents a difference between the number of electrons (one unit of very small magnets) that are rotating (spinning) upwardly in the solid material and the number of electrons that are spinning downwardly in the solid material. A magnitude of spin polarizability is specified by compositions of magnetic materials comprising mainly a ferromagnetic material layer. Accordingly, since the changing ratio" of the resistance value increases as the spin polarizabilities P1, P2 of the respective ferromagnetic material layers increase, if the ferromagnetic material layer is made of a magnetic material having a composition with high spin polarizability, then a TMR ratio (ratio between a resistance value in the high resistance state and a resistance value in the low resistance state) of the tunnel magnetoresistive effect element containing the ferromagnetic material layer can increase. As result, excellent information read characteristics can be realized in the MRAM.

To this end, in most cases, the TMR element uses any one of Fe group ferromagnetic material elements such as Fe (iron), Co (cobalt) and Ni (nickel) that are magnetic materials having compositions with high spin polarizabilities or alloy of a combination of more than two of the above-mentioned Fe group ferromagnetic material elements as a material to form the ferromagnetic material layer. As an insulating material layer sandwiched between these ferromagnetic material layers, there is generally used an $Al_2O_3$ (alumina) layer that is obtained after a thin film conductive layer of Al (aluminum), which is a nonmagnetic metal material, for example, had been oxidized by native oxidation in the atmospheric pressure during a long period of time or had been oxidized by plasma oxidation or radical oxidation which are known as "strong" oxidation methods". The reason for this is that, because the insulating material layer functions as a tunnel barrier layer to generate TMR effect, not only the spin polarizability of each ferromagnetic material layer should increase but also the insulating material layer interposed between these ferromagnetic material layers should be made uniform and thin in order to obtain a large TMR ratio.

To realize excellent read characteristics in the MRAM, it is very effective in increasing TMR ratios of respective TMR elements comprising the MRAM and is also effective in suppressing dispersions of resistance values among the TMR elements. Therefore, if dispersions of resistance values among the TMR elements are suppressed while the TMR ratios are being increased, then it becomes possible to realize an MRAM that can operate at higher speed and which can be integrated with higher integration degree.

However, the TMR ratio and the dispersion of the resistance value in the TMR element depends considerably upon the characteristics of the insulating material layer (tunnel barrier layer) comprising the TMR element. Accordingly, depending upon the characteristics of the insulating material layer, there is a possibility that undesirable results such as decrease of a TMR ratio and increase of dispersion of a resistance value will be brought about. In particular, in the above-mentioned TMR element according to the related-art, since the insulating material layer sandwiched between the ferromagnetic material layers is obtained in such a manner that an Al conductive layer is oxidized by a suitable oxidation method such as, native oxidation, plasma oxidation or radical oxidation after one ferromagnetic material layer had been formed and the Al conductive layer had been deposited on this ferromagnetic material layer, there arises a problem that will follow.

Figure 1A:
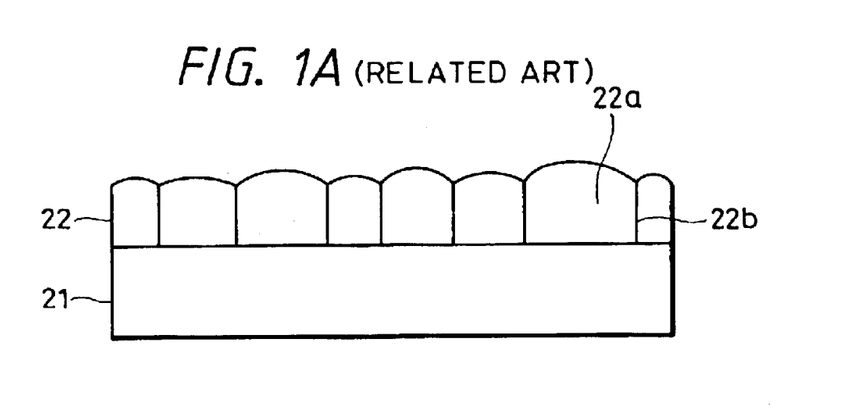
FIG. 1A is a diagram showing a schematic arrangement of a conductive layer deposited on a ferromagnetic material layer.

FIG. 1A is a diagram showing a schematic arrangement of an Al conductive layer 22 deposited on a ferromagnetic material layer 21. As shown in FIG. 1A, the Al conductive layer 22 has a polycrystalline structure and is composed of a set of crystal grains 22a and grain boundaries 22b. In the MTJ structure, since a resistance value depends upon a thickness of an insulating material layer in an exponential fashion, flatness (homogeneity) of the insulating material layer becomes very important. However, if the Al conductive layer 22, which serves as the base of the insulating material layer, has the polycrystalline structure, then since the crystal grains 22a of various sizes exist in the Al conductive layer 22, there is a risk that an insulating material layer having satisfactory flatness will not be obtained. In addition, when the Al conductive layer 22 having the polycrystalline structure is oxidized, first, oxidation starts along the grain boundaries 22b to oxidize the grain boundaries 22b selectively. After the grain boundaries 22b had been oxidized, oxidation proceeds to the insides of the crystal grains 22a to oxidize the insides of the crystal grains 22a.

Figure 1B:
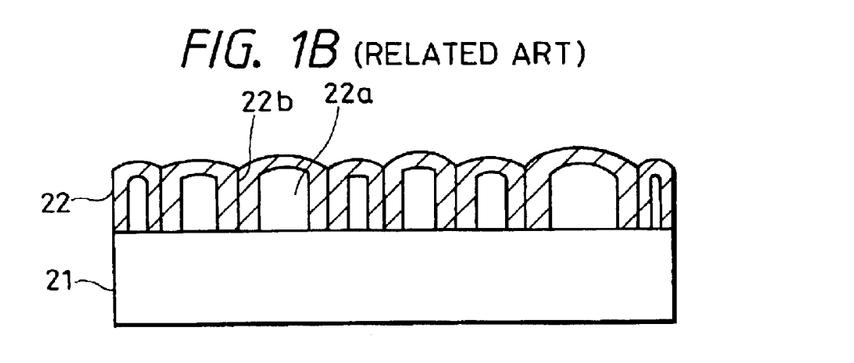
FIG. 1B is a diagram showing the state in which the conductive layer is oxidized by native oxidation.

FIG. 1B is a diagram showing the state in which the Al conductive layer 22 on the ferromagnetic material layer 21 is oxidized by native oxidation. As described above, when the Al conductive layer 22 is oxidized, first, oxidation proceeds to the grain boundaries 22b to selectively oxidize the grain boundaries 22b. From this reason, since native oxidation has low activation energy, although portions near the grain boundaries 22b are oxidized as shown in FIG. 1B (see portions shown hatched in FIG. 1B), the crystal grains 22a cannot be oxidized sufficiently up to the insides thereof.

There is a risk that a resultant insulating material layer will become a tunnel barrier layer having a small oxygen containing amount and whose effective tunnel barrier height is low. When the height of the tunnel barrier layer is low, the TMR ratio decreases rapidly in accordance with increase of a voltage bias, giving rise to deterioration of an S/N (signal-to-noise ratio) obtained when information is read out from the MRAM. Furthermore, if the oxygen containing amount of the insulating material layer is not constant, there is then a possibility that dispersions of resistance values among respective TMR elements will increase.

Figure 1C:
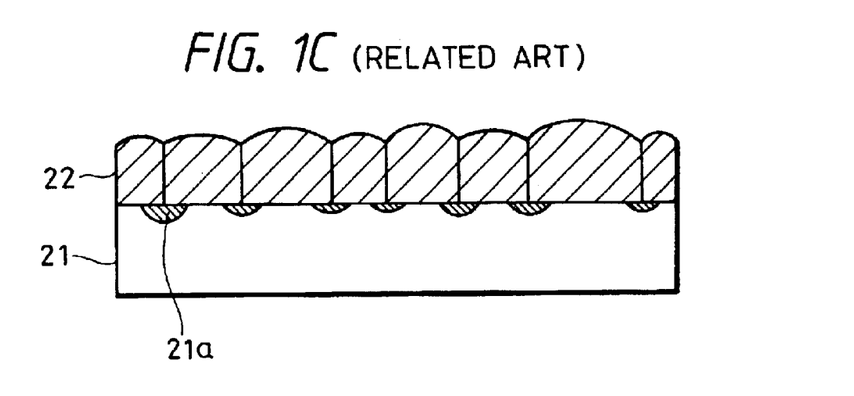
FIG. 1C is a diagram showing the state in which the conductive layer is oxidized by plasma oxidation or radical oxidation.

On the other hand, FIG. 1C is a diagram showing the state in which the Al conductive layer 22 deposited on the ferromagnetic material layer 21 is oxidized by plasma oxidation or radical oxidation. Because the plasma oxidation or the radical oxidation are known as "strong" oxidation methods, even when oxidation proceeds from the grain boundaries 22b to oxidize the grain boundaries 22b, the crystal grains 22a can be oxidized sufficiently up to the insides thereof (see portions shown hatched in FIG. 1C). On the other hand, during oxidation is proceeding up to the inside of the crystal grains 22a, oxidation that had proceeded up to the grain boundaries 22b reaches to the ferromagnetic material layer 21. There is a risk that an interface portion 21a between the Al conductive layer 22 and the ferromagnetic material layer 21 also will be oxidized as shown in FIG. 1C. If the interface portion 21a between the Al conductive layer 22 and the ferromagnetic material layer 21 is oxidized, then the spin polarizability in the ferromagnetic material layer is lowered, giving rise to decrease of the TMR ratio. With respect to this point, although it is considered that intensity of oxidation and oxidation time may be suppressed so as to prevent the ferromagnetic material layer 21 from being oxidized, in that case, similarly to the case of the native oxidation, there arises a problem that the crystal grains 22a cannot be oxidized sufficiently up to their insides.

SUMMARY OF THE INVENTION

In view of the aforesaid aspect, it is an object of the present invention to provide a tunnel magnetoresistive effect element, a manufacturing method thereof and a magnetic memory device in which dispersions of resistance values among respective elements can be suppressed while a large TMR ratio can be obtained.

According to an aspect of the present invention, there is provided a tunnel magnetoresistive effect element having a multilayer film structure including two ferromagnetic material layers and a barrier layer sandwiched between these ferromagnetic material layers, wherein the barrier layer is formed by oxidizing a conductive layer and the conductive layer is formed by adding a material of an element different from a metal material to said metal material serving as a principal component thereof.

According to other aspect of the present invention, there is provided a manufacturing method for manufacturing a tunnel magnetoresistive effect element having a multilayer film structure including two ferromagnetic material layers and a barrier layer sandwiched between these ferromagnetic material layers. This manufacturing method is comprised of the steps of depositing one of said ferromagnetic material, thereafter, depositing a conductive layer formed by adding a material of an element different from a metal material to said metal material serving as a principal component thereof onto said one ferromagnetic material layer, forming the barrier layer by oxidizing the conductive layer, and depositing the other ferromagnetic material layer on the barrier layer in later stage.

In accordance with a further aspect of the present invention, there is provided a magnetic memory device including a tunnel magnetoresistive effect element having a multilayer film structure including two ferromagnetic material layers and a barrier layer sandwiched between these ferromagnetic material layers and which is able to record information by the use of change of magnetization direction of the ferromagnetic material layer, wherein the barrier layer is formed by oxidizing a conductive layer and the conductive layer is formed by adding a material of an element different from a metal material to said metal material serving as a principal component thereof.

According to the tunnel magnetoresistive effect element having the above-described arrangement or the tunnel magnetoresistive effect element manufactured by the manufacturing method having the above-described process or the magnetic memory device having the above-described arrangement, since the conductive layer is formed by adding the material of the different element to the metal material, the material of the different element can suppress growth of crystal grains and the sizes of crystal grains in the conductive layer can be reduced as compared with the case in which the metal material does not contain added material of an element. Therefore, since the crystal grains comprising the conductive layer can be reduced in size, flatness in the conductive layer can be improved. Further, since the ratio at which the crystal grains occupy the conductive layer increases as the crystal grains become smaller in size, there is formed the conductive layer that can be easily oxidized. That is, the crystal grains can be sufficiently oxidized up to their insides by an oxidation method of which the activation energy is small. Furthermore, even in the strong oxidation, it becomes possible to end the oxidation to the insides of the crystal grains in the conductive layer before the ferromagnetic material layer is oxidized by optimizing intensity of oxidation and oxidation time and the like.

BRIEF DESCRIPTION OF THE DRAWINGS

FIGS. 1A to 1C are schematic diagrams showing an outline of an example of a process in which a tunnel barrier layer is formed in a TMR element according to the related art, wherein:

FIGS. 5A to 5C are schematic diagrams showing an outline of an example of a process in which a barrier layer is formed on a TMR element according to the present invention, wherein:

DESCRIPTION OF THE PREFERRED EMBODIMENTS

A tunnel magnetoresistive effect element, a method of manufacturing a tunnel magnetoresistive effect element and a magnetic memory device according to the present invention will be described below with reference to the drawings. In the following description, let us explain a tunnel magnetoresistive effect element with reference to a TMR element and a magnetic memory device with reference to an MRAM including a TMR element, by way of example, respectively.

First, a schematic arrangement of the whole of a magnetic memory device according to the present invention will be described.

Figure 2:
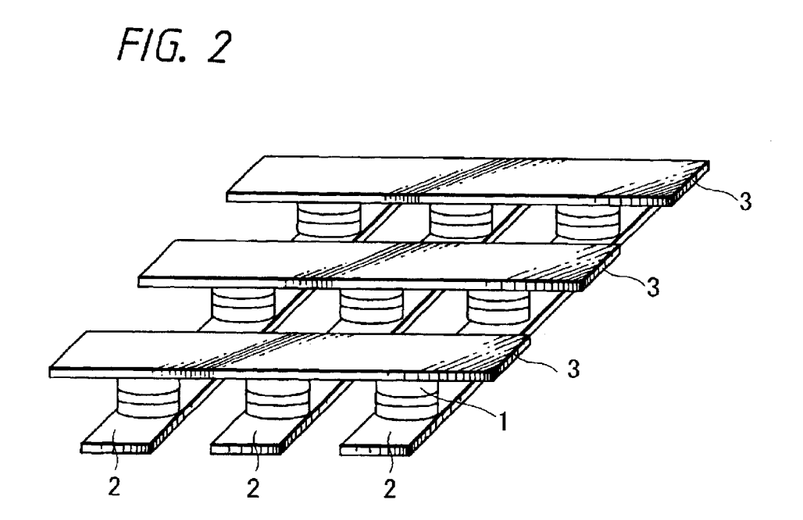
FIG. 2 is a schematic perspective view showing an example of a fundamental arrangement of an MRAM (magnetic random access memory)

FIG. 2 of the accompanying drawings is a schematic perspective view showing an example of a fundamental arrangement of an MRAM (magnetic random access memory). As shown in FIG. 2, the MRAM includes a plurality of TMR elements 1 that are disposed in an XY matrix fashion (i.e. two-dimensional fashion). Word lines 2 and bit lines 3 that are intersecting with each other are provided so as to cross groups of TMR elements 1 in response to rows and columns in which these TMR elements 1 are located. The TMR elements 1 are disposed such that they are located at these crossing areas under the condition that they may be sandwiched by the word lines 2 and the bits lines 3 in the upper and lower direction. The word lines 2 and the bit lines 3 are formed by a well-known method in which word lines and bit lines are obtained by selectively etching conductive substances of Al, Cu (copper) or alloy thereof after the conductive substances had been deposited chemically or physically.

Figure 3:
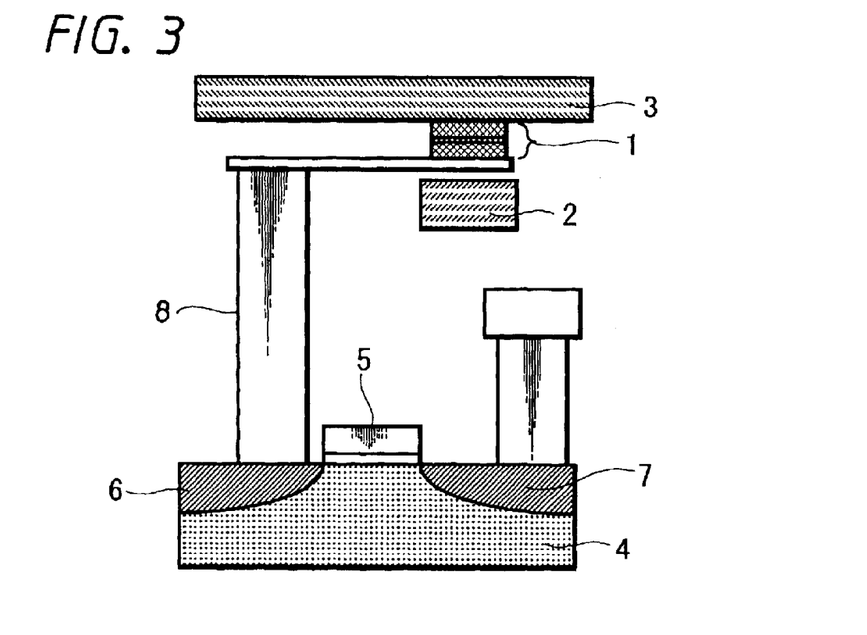
FIG. 3 is a schematic diagram showing an example of an arrangement of a single TMR (tunnel magnetoresistive) element portion that composes the MRAM.

FIG. 3 is a schematic diagram showing an example of an arrangement of a cross-section of a single TMR element portion that composes the MRAM. As shown in FIG. 3, in the respective TMR element portions, a field-effect transistor (FET) composed of a gate electrode 5, a source region 6 and a drain region 7 is disposed on a semiconductor substrate 4. The word line 2, the TMR element 1 and the bit line 3 are disposed over the field-effect transistor, in that order. As is clear from FIG. 3, the TMR element 1 is disposed at the point at which the bit line 2 and the word line 3 cross each other in such a manner that it may be sandwiched by the bit line 2 and the word line 3 in the upper and lower direction. The TMR element 1 is interconnected with the field-effect transistor via a bypass line 8.

According to this arrangement, the MRAM generates a synthesized current magnetic field in the TMR element 1 with application of a current to the word lines 2 and the bit lines 3 and is able to write information in the TMR element 1 by selectively changing the magnetization direction of the free layer in the TMR element 1 located at the crossing point of the word line 2 and the bit line 1 owing to asteroid characteristics. When the MRAM reads out information from the TMR element 1, the MRAM is able to read out information from the TMR element 1 in such a manner as to obtain the magnetization direction of the free layer in the TMR element 1 as a voltage signal after the TMR element 1 had been selected by the field-effect transistor.

Figure 4:
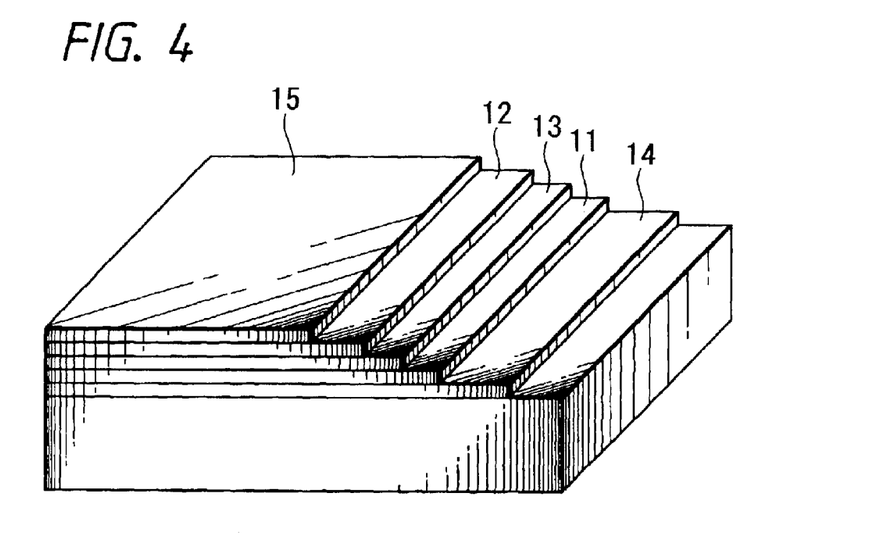
FIG. 4 is a cross-sectional side view showing a specific example of a lamination arrangement of a TMR element having an MTJ (magnetic tunnel junction) structure.

Subsequently, an arrangement of the TMR element 1 itself for use with such MRAM will be described. The TMR element 1 has a film arrangement with an MTJ (magnetic tunnel junction) structure. FIG. 4 is a schematic diagram showing an example of a fundamental arrangement of the MTJ structure. As shown in FIG. 4, the MTJ structure has a trilayer structure of ferromagnetic material/insulating material/ferromagnetic material, wherein the magnetization direction of one ferromagnetic material layer is used as a fixed layer (or fixed reference layer) 11 and the magnetization direction of the other ferromagnetic material layer is used as a free layer 12. Information is written (recorded) on the TMR element 1 by changing the magnetization direction of the free layer 12 with application of a synthesized current magnetic field generated from the word lines 2 and the bit lines 3, and the magnetization direction in the free layer 12 and the voltage signal are made corresponding to each other through tunnel MR effect.

These fixed layer 11 and free layer 12 are layers both made of a ferromagnetic material having a composition with high spin polarizability. Further, the fixed layer 11 and the free layer 12 are layers formed by any one of ferromagnetic material elements of Fe group such as Fe, Co, Ni or an alloy of a combination of more than two of these ferromagnetic material elements. However, these ferromagnetic material layers 11, 12 are not limited to single layers and may have laminating layer structures of either magnetic layers or nonmagnetic layers so long as an interface between these ferromagnetic material layers 11, 12 and the insulating material layer sandwiched by these ferromagnetic material layers 11 and 12 is made of a ferromagnetic material. To be concrete, the TMR element 1 may have a so-called spin-valve structure in which the magnetization direction of any one ferromagnetic material layer (e.g. fixed layer 11) is fixed by adjoining one ferromagnetic material layer (fixed layer 11) to an antiferromagnetic material layer.

The insulating material layer sandwiched between the fixed layer 11 and the free layer 12 may function as a tunnel barrier layer 13. This tunnel barrier layer 13 is obtained in such a manner that a thin-film conductive layer having a film thickness of 1 nm, for example, was oxidized by a suitable oxidation method such as native oxidation, plasma oxidation or radical oxidation after the thin-film conductive layer had been obtained by adding a material of an element different from a metal material to said metal material serving as a principal component thereof.

Al (aluminum), for example, may be given as an example of a metal material serving as a principal component. B (boron), for example, may be given as an example of a material of a different element that should be added to the Al (aluminum). However, this material of a different element is not limited to the B (boron) and may be other elements so long as they can achieve effects, which will be described later on, similarly to the case of the B (boron). For example, a material of a different element may be any one of or a combination of more than two of Li (lithium) Mg (magnesium), Si (silicon), K (potassium), Ca (calcium), Sc (scandium), Be (beryllium), Ti (titanium), Sr (strontium), C (carbon), P (phosphorous) and S (sulfur).

With respect to the added amount of the material of the different element, the containing amount thereof in the thin-film conductive layer should preferably be less than 1 atomic percent. The reason for this is that, depending upon the kind of the different element, when the added amount increases, crystal grains of metal compound are generated so that it becomes difficult to achieve actions which will be described later on. Moreover, there is a risk that oxidation will be disturbed by metal compounds generated when the added amount of the material of the different element increases.

Further, the TMR element 1 includes other layers such as an underlayer 14 and a protective layer 15 in addition to the fixed layer 11, the free layer 12 and the tunnel barrier layer 13. These layers may constitute a multilayer film structure. Other layers are substantially similar to those of the related art and therefore need not be described herein.

Figure 5A:
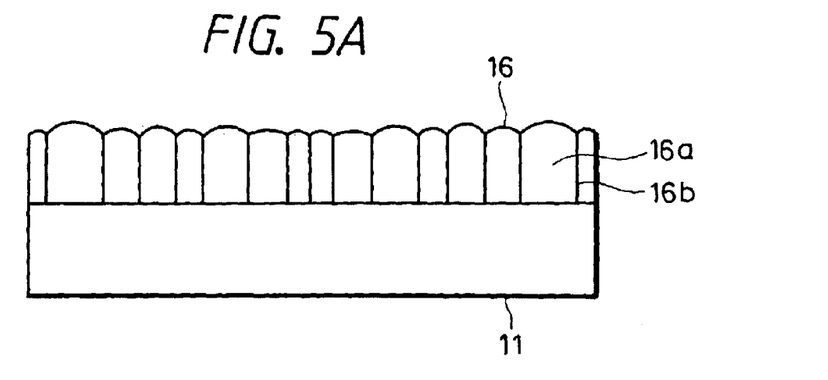
FIG. 5A is a diagram showing a conductive layer that had been micro-crystallized.
Figure 5B:
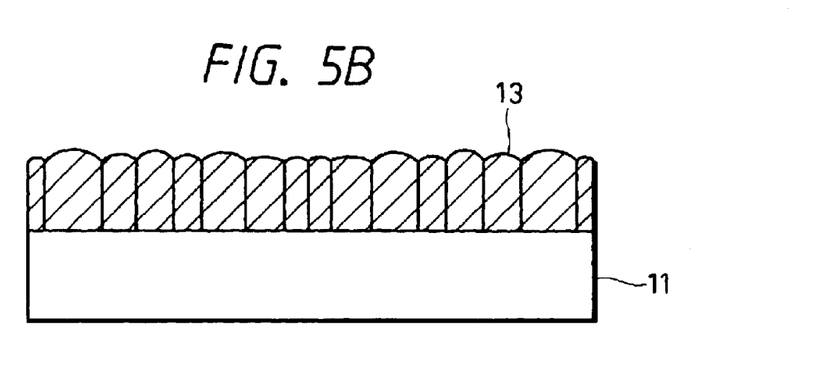
FIG. 5B is a diagram showing the state in which the conductive layer shown in FIG. 5A was oxidized.
Figure 5C:
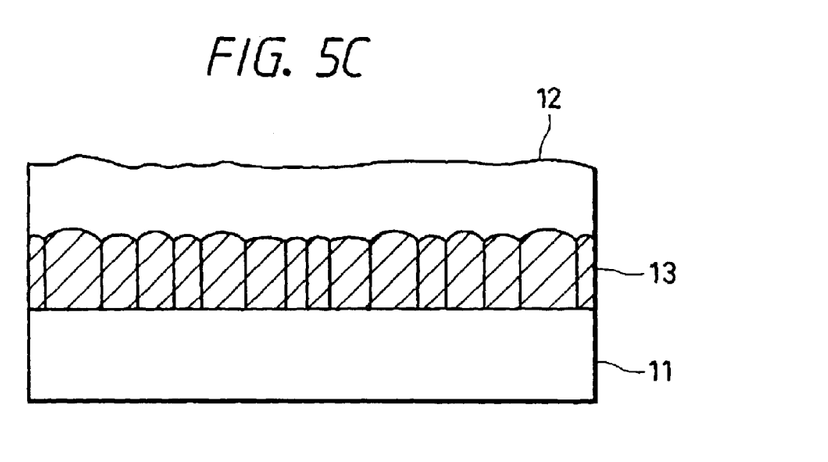
FIG. 5C is a diagram showing the state in which a ferromagnetic material layer is laminated on a barrier layer that had been obtained by oxidation.

Next, a method of manufacturing the TMR element 1 having the above-mentioned arrangement will be described. In the following description, with reference to the case of manufacturing a TMR element which might be called a bottom type in which the fixed layer 11 is located under the free layer 12, the process for forming mainly the tunnel barrier layer 13 will be described below. FIGS. 5A to 5C are schematic diagrams showing an outline of an example of the process for forming the tunnel barrier layer 13.

When the TMR element 1 is manufactured, first, a Ta (tantalum) film, a PtMn (platinum manganese) film, a CoFe (cobalt ferrum) film are laminated on a Si (silicon) substrate the surface of which was thermally oxidized by a magnetron-sputtering system whose back pressure had been evacuated up to a ultra-high vacuum region, in that order. The Ta film functions as the underlayer 14, the PtMn film functions as the antiferromagnetic material layer for fixing the magnetization, and the CoFe film functions as the fixed layer 11 of which the magnetization is fixed by the PtMn film, respectively.

After those films had been laminated on the Si substrate, a 1 nm-thick thin-film conductive layer formed of a metal Al layer containing. B (boron) as additive is deposited on the CoFe film by the use of a metal Al target containing 0.5 atomic percent of B which is a material of a different element with a direct-current (DC) sputtering system. Since a very small amount of the boron (B), which is the material of the different element, is added to the aluminum (Al) serving as a principal component, the thin-film conductive layer that is deposited on the CoFe film is micro-crystallized accordingly.

FIG. 5A is a schematic diagram showing the thin-film conductive layer that has been micro-crystallized so far. Because the thin-film conductive layer 16 deposited on the fixed layer 11 formed of the PtMn film contains the boron (B) which is the added element of very small amount, the grain size of the crystal grain 16a of the thin-film conductive layer 16 tends to reduce in size as compared with the case in which the thin-film conductive layer 16 does not contain the added element. The reason for this is that, when the thin-film conductive layer 16 is deposited on the fixed layer 11, the added element B disturbs growth of the crystal grains 16a and acts as nucleus to generate the crystal grains 16a. Specifically, the thin-film conductive layer 16 that contains a very small amount of added element B bas many nucleuses to generate the crystal grains 16a as compared with the case in which the thin-film conductive layer 16 does not contain the added element so that an average grain size of the crystal grains 16a decrease. Accordingly, since the crystal grains 16a are becoming small, flatness of the thin-film conductive layer 16 can be improved.

In addition, when the thin-film conductive layer 16 is deposited on the fixed layer 11, since the metal target containing a very small amount of the added element B in advance is used, similar actions and effects are achieved within the metal target. That is, the crystal grain becomes small as compared with the metal target that does not contain the added element and thereby the thin-film conductive layer 16 can be micro-crystallized. Accordingly, target clusters that are sputtered together with target atoms when the thin-film conductive layer 16 is deposited on the fixed layer 11 can be made small so that flatness of the thin-film conductive film 16 can be improved.

After the thin-film conductive layer 16 had been deposited on the CoFe film, the resultant thin-film conductive film 16 is oxidized by plasma oxidation in the atmosphere of pure oxygen. Thus, as shown in FIG. 5B, the tunnel barrier layer 13 formed of uniform Al oxide can be formed on the fixed layer 11. At that time, in the thin-film conductive film 16, since the grain size of the crystal grain 16a is small as described above, the ratio at which the grain boundaries 16b occupy the thin-film conductive layer 16 is large as compared with the ratio at which the crystal grains 16a occupy the thin-film conductive layer 16. Therefore, the thin-film conductive layer 16 may be easily oxidized so that the crystal grains 16a can be sufficiently oxidized up to their insides. In addition, since the thin-film conductive layer 16 is easily oxidized, even when "strong" oxidation method such as plasma oxidation is employed, by optimizing intensity of oxidation and oxidation time, it becomes possible to end oxidation to the insides of the crystal grains 16a before influence of oxidation is exerted upon the fixed layer 11 to thereby oxidize the fixed layer 11.

This relationship is not limited to the case in which the thin-film conductive layer 16 is oxidized by plasma oxidation and may apply for the case in which the thin-film conductive layer 16 is oxidized by radical oxidation as well. Since the thin-film conductive layer 16 is easily oxidized not by "strong" oxidation such as plasma oxidation and radical oxidation but by native oxidation in atmosphere of pure oxygen and oxidation in the atmospheric pressure which are inherently weak oxidations, the crystal grains 16a can be oxidized up to their insides sufficiently. That is, the thin-film conductive film 16 can be oxidized by any one of plasma oxidation, radical oxidation, native oxidation or oxidation in the atmospheric pressure.

After the tunnel barrier layer 13 had been deposited on the fixed layer 11 by oxidizing the thin-film conductive layer 16, as shown in FIG. 5C, the CoFe film and the Ta film are again laminated on the tunnel barrier layer 13 by the magnetron sputtering system, in that order. This CoFe film functions as the free layer 12 and the Ta film functions as the protective layer 15, respectively. Then, at the end, heat-treatment for regularly alloying the PtMn film that has already been deposited in the magnetic field at temperature of 280° C. for an hour.

Figure 6:
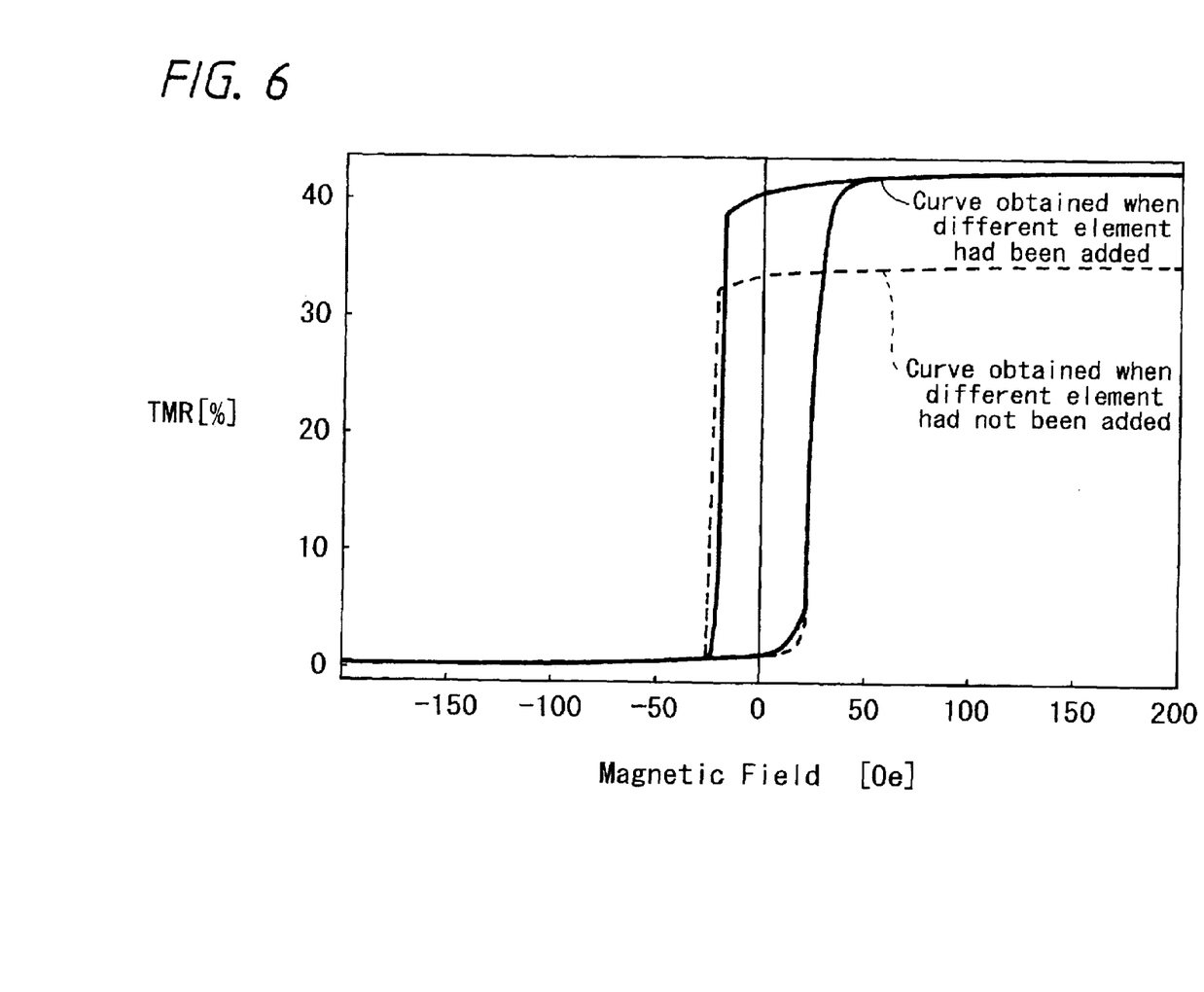
FIG. 6 is a characteristic graph to which reference will be made in explaining characteristics of a TMR element according to the present invention and shows specific examples of TMR curves that represent changing ratios of resistance values relative to magnetic fields.

Next, characteristics of the TMR element 1 that had been manufactured by the above-mentioned process will be described with reference to FIG. 6. FIG. 6 is a characteristic graph to which reference will be made in explaining characteristics of the TMR element according to the present invention and shows specific examples of TMR curves that represent ratios at which resistance values change relative to magnetic fields. The examples shown in FIG. 6 show a TMR curve (solid-line curve in FIG. 6) obtained from the TMR element 1, manufactured by the above-mentioned process, with application of bias voltage of 0.1V at room temperature and a TMR curve (dashed-line curve in FIG. 6) obtained from the related-art TMR element serving as a comparative example. Although both of the TMR element 1 according to this embodiment and the TMR element according to the comparative example have similar film arrangements, they differ from each other only in whether the tunnel barrier layer 13 contains a material of a different element or not.

A study of the example shown in FIG. 6 reveals that, while a TMR ratio of the related-art TMR element in which the tunnel barrier layer 13 was formed from the metal Al layer without element B of different kind being added was approximately 35%, a TMR ratio of the TMR element 1 according to this embodiment reached to approximately 43%. Moreover, having measured and evaluated dispersions of tunnel resistances within a wafer having a diameter of 100 mm, it is to be understood that, while dispersion of a tunnel resistance of the related-art TMR element was approximately 12%, dispersion of a tunnel resistance of the TMR element 1 according to this embodiment decreased up to approximately 6.4%. The reasons for these will be supposed as follows.

In general, the thin-film conductive layer formed of the metal Al layer is composed of the crystal grains and the grain boundaries as earlier noted. Then, when this thin-film conductive layer is oxidized, first, oxidation starts from the portion of the grain boundary and the grain boundary starts to be oxidized. Accordingly, when oxidation reaches to the interface between the thin-film conductive layer and the fixed layer 11 along the grain boundary, the fixed layer 11 is caused to be oxidized, giving rise to decrease of the TMR ratio. Moreover, when the inside structures of the crystal grains and the grain boundaries and the oxidation degree of the fixed layer 11 are different at every element within the same wafer, the dispersion of the tunnel resistance within the same wafer increases. On the other hand, with respect to the thin-film conductive layer 16 formed of the metal Al layer with the element B of different kind being added, since the size of the crystal grain 16a is smaller than that obtained from the thin-film conductive layer without the element B of different kind being added, intensity of oxidation and oxidation time that can sufficiently oxidize the insides of the crystal grains 16a may decrease. For this reason, the oxidation for oxidizing the thin-film conductive layer 16 can be ended before oxidation reaches to the fixed layer 11 along the grain boundary 16b to oxidize the fixed layer 11. As a result, according to the TMR element of the present invention, the TMR ratio thereof can be prevented from decreasing unlike the related-art TMR element.

As the reasons in which dispersion of a tunnel resistance within the same wafer decreases, there may be considered the following reasons:

(1) The fixed layer 11 can be prevented from being oxidized;
(2) Since the crystal grain 16a is small in grain size, flatness of the thin-film conductive layer 16 can be improved; and
(3) Since the crystal grain 16a is small ingrain size, dispersion between the elements of the inside structures of the crystal grain 16a and the grain boundary 16b is small.

As described above, according to the TMR element obtained by the manufacturing process that had been set forth in this embodiment, i.e. the TMR element 1 having the arrangement that had been set forth in this embodiment, since the tunnel barrier layer 13 sandwiched between the fixed layer 11 and the free layer 12 is formed by oxidizing the thin-film conductive layer 16 and the thin-film conductive layer 16 is formed by adding the material of the different element to the metal material, the crystal grains comprising the thin-film conductive layer 16 can become small as compared with the case in which the element material of the different element is not added to the metal material, flatness of the thin-film conductive layer 16 can be improved and the thin-film conductive layer 16 that is easily oxidized can be realized. Accordingly, when the tunnel barrier layer 13 is formed, the thin-film conductive layer 16 can be prevented from being oxidized insufficiently and the fixed layer 11 and the like can be prevented from being oxidized with the result that the TMR ratio in the TMR element 1 can be prevented from decreasing. Furthermore, since the thin-film conductive layer 16 has excellent flatness and is oxidized uniformly, it becomes possible to suppress the dispersion of the tunnel resistance.

Therefore, if the MRAM is comprised of the TMR element 1 according to this embodiment, then since dispersion of the resistance value between the elements can be suppressed to be small while a large TMR ratio is being obtained, excellent read characteristics can be realized. That is, it becomes possible to realize the MRAM which can operate at higher speed and which can be integrated with higher integration degree.

While the bottom type TMR element 1 in which the fixed layer 11 is located under the free layer 12 has been described so far in this embodiment by way of example, the present invention is not limited thereto. That is, the present invention can be applied, in exactly the same manner as that of this embodiment, to a so-called top type TMR element 1 in which the free layer 12 is located below the fixed layer 11.

While the present invention has been described so far with reference to the example in which the thin-film conductive layer 16 serving as the base of the tunnel barrier layer 13 is deposited on the fixed layer 11 by DC sputtering according to this embodiment, the present invention is not limited thereto. That is, the thin-film conductive layer 16 may be deposited by other methods than sputtering, e.g. other vapor-deposition method such as a vacuum evaporation method. When the thin-film conductive layer 16 is deposited by using various kinds of vapor-deposition methods, it is possible to suppress the growth of the crystal grains 16a in the thin-film conductive layer 16 by properly setting conditions under which the thin-film conductive layer 16 should be deposited. Accordingly, when the thin-film conductive layer 16 is deposited, it is preferable that the film-deposition conditions that can suppress the growth of the crystal grains 16a should be adopted. Thus, with the above-mentioned proper film-deposition conditions together with actions achieved by addition of a material of a different element, the TMR ratio can be increased reliably and the dispersion of the resistance value between the elements can be decreased reliably.

As set forth above, in the tunnel magnetoresistive effect element, the manufacturing method thereof and the magnetic memory device according to the present invention, since the tunnel barrier layer sandwiched between the two ferromagnetic material layers is formed by oxidizing the conductive layer that contains added material of a different element, the conductive layer can be oxidized sufficiently and the ferromagnetic material layer can be prevented from being oxidized. Therefore, it is possible to prevent the TMR ratio from being decreased due to causes such as insufficient oxidation of the conductive layer and oxidation of the ferromagnetic material layer. Further, flatness of the conductive layer can be improved. Furthermore, since the conductive layer is oxidized uniformly, it becomes possible to suppress the dispersion of the tunnel resistance value.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A tunnel magnetoresistive effect element having a multilayer film structure including two ferromagnetic material layers and a tunnel barrier layer sandwiched between said two ferromagnetic material layers, wherein said barrier layer is formed by oxidizing a metal layer and said metal layer is formed by adding a material of an element different from a metal material serving as a principal component of the metal layer.

2. A tunnel magnetoresistive effect element according to claim 1, wherein said metal material is aluminum.

3. A tunnel magnetoresistive effect element according to claim 1, wherein said material of a different element is any one of or a combination of more than two of boron, lithium, magnesium, silicon, potassium, calcium, scandium, beryllium, titanium, strontium, carbon, phosphorous, sulfur; and the amount thereof in said conductive layer is less than 1 atomic percent.

* * * * *